United States Patent
Enz et al.

(10) Patent No.: US 10,430,336 B2
(45) Date of Patent: Oct. 1, 2019

(54) LOCK-FREE RAID IMPLEMENTATION IN MULTI-QUEUE ARCHITECTURE

(71) Applicant: EXTEN Technologies, Inc., Austin, TX (US)

(72) Inventors: Michael Enz, Fargo, ND (US); Ashwin Kamath, Cedar Park, TX (US)

(73) Assignee: Exten Technologies, Inc., Austin, TX (US)

( * ) Notice: Subject to any disclaimer, the term of this patent is extended or adjusted under 35 U.S.C. 154(b) by 171 days.

(21) Appl. No.: 15/494,601

(22) Filed: Apr. 24, 2017

(65) Prior Publication Data
US 2018/0307439 A1    Oct. 25, 2018

(51) Int. Cl.
| | |
|---|---|
| *G06F 12/0804* | (2016.01) |
| *G06F 9/50* | (2006.01) |
| *G06F 12/0868* | (2016.01) |
| *G06F 12/0897* | (2016.01) |

(52) U.S. Cl.
CPC ............ *G06F 12/0804* (2013.01); *G06F 9/50* (2013.01); *G06F 12/0868* (2013.01); *G06F 12/0897* (2013.01); *G06F 2212/1041* (2013.01); *G06F 2212/262* (2013.01); *G06F 2212/62* (2013.01)

(58) Field of Classification Search
CPC .... G06F 3/0613; G06F 3/0659; G06F 3/0688; G06F 12/0804; G06F 2212/1041; G06F 2212/62
See application file for complete search history.

(56) References Cited

U.S. PATENT DOCUMENTS

| | | | |
|---|---|---|---|
| 2006/0026443 A1 | 2/2006 | McMahan | |
| 2008/0120485 A1* | 5/2008 | Rothman | G06F 12/06 711/165 |
| 2014/0337540 A1* | 11/2014 | Johnson | G06F 13/14 710/5 |
| 2019/0050168 A1 | 2/2019 | Enz | |

OTHER PUBLICATIONS

Zhang, Jack. Moving to PCI Express* Based Solid-State Drive with NVM Express, Jul. 2014 (Year: 2014).*
NVM Express Revision 1.2, Nov. 2014 (Year: 2014).*
Office Action issued for U.S. Appl. No. 16/163,236, dated Dec. 28, 2018, 12 pages.
Notice of Allowance for U.S. Appl. No. 16/163,236, dated Apr. 8, 2019, 5 pgs.

* cited by examiner

*Primary Examiner* — Larry T Mackall
(74) *Attorney, Agent, or Firm* — Sprinkle IP Law Group

(57) ABSTRACT

Systems and methods (including hardware and software) are disclosed where all common RAID storage levels are implemented for multi-queue hardware by isolating RAID stripes to a single central processing unit (CPU) core affinity. Fixed CPU affinity is used for any piece of data that may be modified. Instead of blocking CPUs that must access or modify a piece of data, the request is efficiently moved to the CPU that owns that data. In this manner the system is completely asynchronous, efficient, and scalable.

13 Claims, 4 Drawing Sheets

LOCK-FREE RAID IMPLEMENTATION IN MULTI-QUEUE ARCHITECTURE

TECHNICAL FIELD

The subject disclosure relates generally to computer software and hardware design. In particular, the subject disclosure relates to lock-free RAID implementation in multi-queue architecture.

BACKGROUND

The performance goals of storage software have increased by several orders of magnitude with the arrival of solid state drives (SSD). This significant increase in performance requires a revamp of conventional software design to eliminate bottlenecks from, for example, lock acquisition and contention.

Conventional storage and networking software does not account for parallel hardware interfaces present in non-volatile memory express (NVME) storage devices and remote direct memory access (RDMA) network adapters. These interfaces must operate independently for maximum performance.

Redundant array of independent disks (RAID) levels allow storing additional redundancy information such that one or more drives may fail without losing data. For SSD drives, media failure is still common and RAID may be applied to avoid data loss from, for example, NAND wear, retention, or read/program disturb.

Conventional RAID has not evolved with the increased performance of NVME drives. Conventional solutions have been to pursue new data storage formats, such as compressing and replicating data on different drives. However, these software intensive algorithms tend to lower the total performance capable from a storage appliance.

SUMMARY OF THE SUBJECT DISCLOSURE

The present subject disclosure provides exemplary embodiments of systems and methods (including hardware and software) where all common RAID storage levels are implemented for multi-queue hardware by isolating RAID stripes to a single central processing unit (CPU) core affinity. Exemplary embodiments of the present subject disclosure use fixed CPU affinity for any piece of data that may be modified. Instead of blocking CPUs that must access or modify a piece of data, the request is efficiently moved to the CPU that owns that data. In this manner the system is completely asynchronous, efficient, and scalable.

In one exemplary embodiment, the present subject matter is a method for lock-free RAID implementation. The method includes receiving at a first core a client input/output (IO) request having a data address; computing a stripe number as a function of the data address; computing a central processing unit (CPU) core number as a function of the stripe number; routing the request to a second core having the computed CPU core number.

In another exemplary embodiment, the present subject matter is a storage appliance. The storage appliance includes a plurality of central processing unit (CPU) sockets, each socket including a plurality of cores; wherein each core operates independently without locks.

In yet another exemplary embodiment, the present subject matter is a storage appliance. The storage appliance includes a plurality of central processing unit (CPU) sockets, each socket including a plurality of cores; wherein each core operates independently without locks; wherein when acted upon by a processor, is adapted for performing the following steps: receiving at a first core a client input/output (IO) request having a data address; computing a stripe number as a function of the data address; computing a central processing unit (CPU) core number as a function of the stripe number; routing the request to a second core having the computed CPU core number; wherein none of the plurality of cores has a lock on the stripe.

BRIEF DESCRIPTION OF THE DRAWINGS

Various exemplary embodiments of this disclosure will be described in detail, wherein like reference numerals refer to identical or similar components or steps, with reference to the following figures, wherein.

DETAILED DESCRIPTION

The present subject disclosure uses fixed CPU affinity for any piece of data that may be modified. Instead of blocking CPUs that must access or modify a piece of data, the request is efficiently moved to the CPU that owns that data. In this manner the system is completely asynchronous, efficient, and scalable.

The scalable software design works very effectively in a multi-core, multi-socket server with many NVME solid state drives. The techniques described here work with any type, capacity or speed of NVME drive. The subject disclosure is equally applicable to local or remote NVME devices connected via NVME over Fabrics network.

The present subject disclosure will also work with legacy drives (SATA, SAS, iSCSI) via, for example, asynchronous Input/Output (IO) kernel interfaces. The software design according to the exemplary embodiments can apply across multiple computer systems in a cluster for distributed RAID computations.

Figure 1:
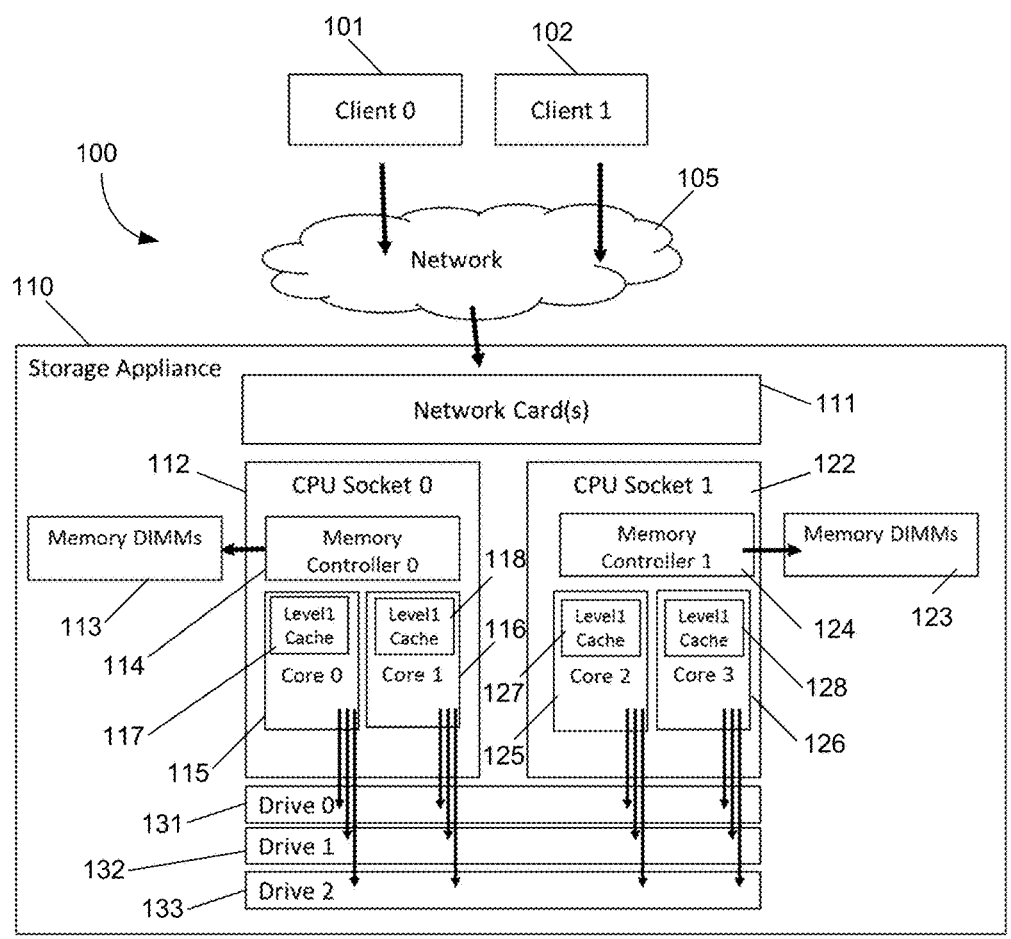
FIG. 1 illustrates an overview perspective of the system, according to an exemplary embodiment of the present subject disclosure.

The subject disclosure is intended to optimize the implementation of a storage appliance to achieve the highest throughput of read and write IO operations. An exemplary system diagram is shown in FIG. 1.

In an exemplary system 100 according to the present subject disclosure, multiple client computers 101, 102, etc., are connected to a storage appliance 110 via a network 105 having network port(s). The network 105 may be an RDMA protocol, such as, for example, ROCE, iWARP, or Infiniband. Network card(s) 111 may interconnect the network 105 with the storage appliance 110. The appliance 110 may have one or more physical CPU sockets 112, 122. Each socket 112, 122 may contain its own dedicated memory controller 114, 124, respectively, connected to dual in-line memory modules (DIMM) 113, 123, and multiple independent CPU cores 115, 116, 125, 126 for executing code. The DIMM may be, for example, random-access memory (RAM). Each core 115, 116, 125, 126 contains a dedicated Level 1 (L1) cache 117, 118, 127, 128 for instructions and data. For example, Core 0 115 has a dedicated L1 cache 117. Core 1 116 has a dedicated L1 cache 118. Core 2 125 has a dedicated L1 cache 127. Core 3 126 has a dedicated L1 cache 128. Each core 115, 116, 125, 126 may use a dedicated interface (submission queue) on a NVME drive.

In exemplary embodiments, each core 115, 116, 125, 126 operates independently, without locks, to optimize the individual core efficiency. Additionally, the dedicated hardware resources are utilized to maximize efficiency, including multiple NVME drive queues, dedicated L1 cache, and per socket memory controller. For example, memory controller 0 114 is integrated with CPU socket 0 112. Similarly, memory controller 1 124 is integrated with CPU socket 1 122.

RAID implementations operate on a set of drives 131, 132, 133, where the same N sectors from each drive are grouped together in a stripe, and communicate with various cores 115, 116, 125, 126. Each drive 131, 132, 133 in the stripe contains a single "strip" of N data sectors. In various RAID levels, a stripe may contain mirrored copies of data (RAID1), data plus parity information (RAID5), data plus dual parity (RAID6), or other combinations. These algorithms may be layered with RAID0 technology to create higher level RAID 10/50/60 algorithms. The present subject matter is compatible with any RAID implementation. Nevertheless, a few exemplary embodiments are shown for sake of clarity. It would be understood by one having ordinary skill in the art how to implement the present technique with all RAID configurations and technologies.

Figure 2A:
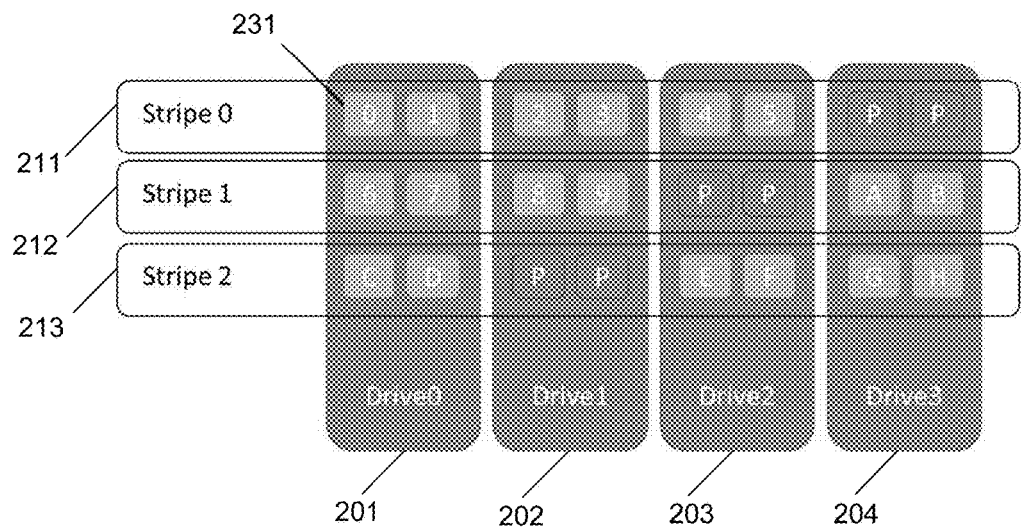
FIG. 2A illustrates an example RAID5 geometry, according to an exemplary embodiment of the present subject disclosure.

FIG. 2A illustrates an example of RAID5 geometry, showing four drives, labeled as Drive 0 201, Drive 1 202, Drive 2 203, and Drive 3 204. Each drive 201, 202, 203, 204 has a strip size of N=2. The user data sectors 231 are sequenced from 0 to H. The parity data is labeled P. In this exemplary embodiment, each stripe 211, 212, 213 is assigned to a single CPU core. Any user access to the data sectors in that stripe is handled by moving the IO request to the assigned CPU core. For example, an IO request to write data sector 0 in Drive0 requires reading sectors 2 and 4, computing the parity (xor operation) for sectors 0, 2, and 4, and writing one sector of parity to Drive 3.

Figure 2B:
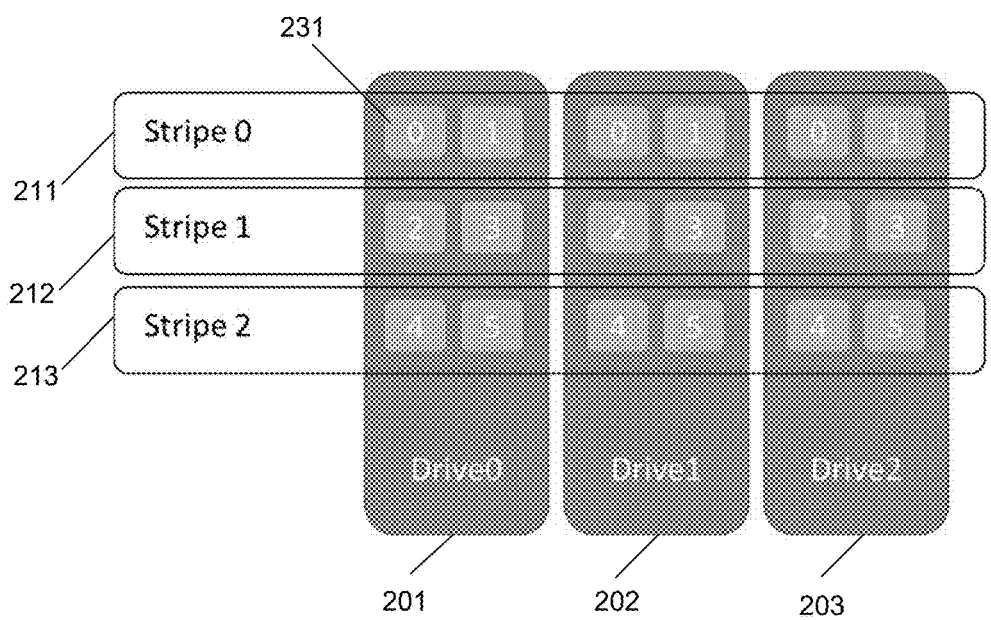
FIG. 2B illustrates an example RAID1 geometry, according to an exemplary embodiment of the present subject disclosure.

FIG. 2B illustrates an example of RAID1 geometry, showing 3 drives, labeled as Drive 0 201, Drive 1 202, and Drive 2 203. Each drive 201, 202, 203 has a strip size of N=2. The user data sectors 231 are sequenced from 0 to 5 with mirror copies on each drive. In this exemplary embodiment, each stripe 211, 212, and 213 is processed by a single CPU core, allowing user and background writes to maintain strict consistency between mirror copies of data. For example, an IO request to write sector 0 requires writing sector 0 in all drives 0-3.

RAID algorithms for writing must ensure that each stripe remains consistent, even if multiple writes arrive for the same stripe simultaneously. A consistent RAID5 stripe requires that the parity computed from data sectors matches the parity saved on the drive. Consistency on RAID1 requires all mirror copies to match.

As used in the present exemplary embodiments, the RAID geometry is decomposed into unique RAID stripes, where a single stripe is "owned" by a single CPU core. All read and write access to the stripe must be done on the same CPU. For RAID 5/6 algorithms, this allows the parity or erasure coding information to be computed consistently for the entire stripe on a single CPU. For RAID1 algorithms, the ownership allows strict consistency between all mirrored copies of the data. Any RAID level may be decomposed into similar stripes and implemented in a similar manner by one having ordinary skill in the art, after consideration of the present subject disclosure.

Figure 3A:
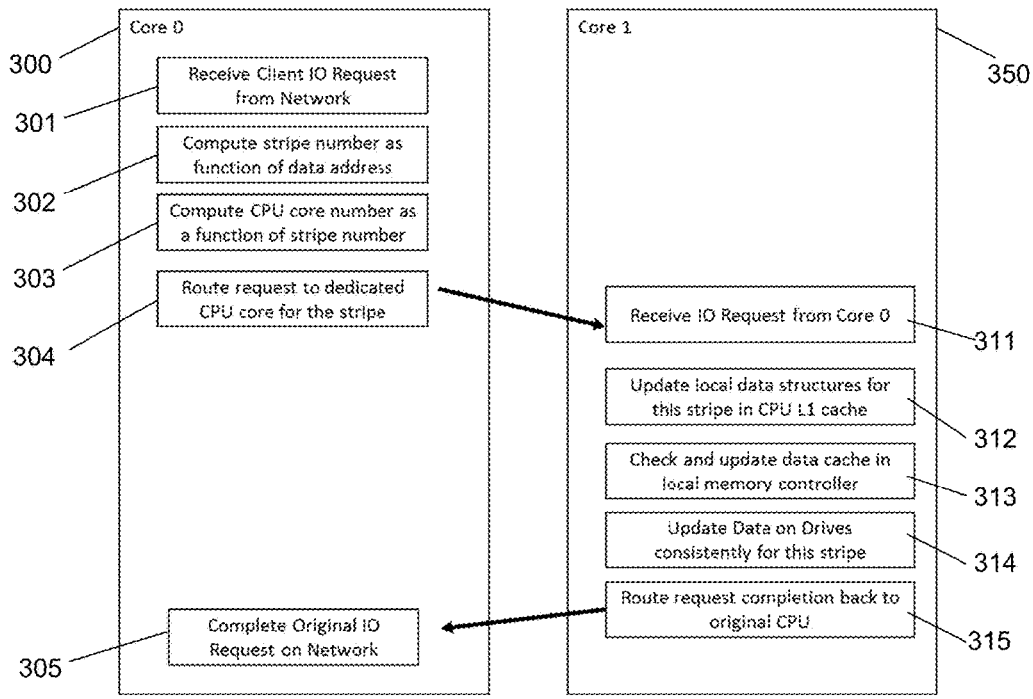
FIG. 3A illustrates a sequence of operations for routing IO requests to the correct CPU, according to an exemplary embodiment of the present subject disclosure.

FIG. 3A illustrates a sequence of operations for routing IO requests to the correct CPU core, according to an exemplary embodiment of the present subject disclosure. Breaking the RAID algorithms into independent stripes allows a highly parallel approach to scaling up performance without suffering from typical synchronization overhead. Each CPU may operate in ideal conditions without synchronization primitives that broadcast to all cores or blocking operations that stall execution. Additionally, data structures for processing the RAID algorithm may be maintained in dedicated L1 memory caches, providing extremely high core efficiency.

In the exemplary process illustrated in FIG. 3A, Core 0 300 begins by receiving a client IO request from the network, as step 301. At step 302, the data address of the IO request is examined to compute the stripe number. At step 303, the stripe number is used to compute the CPU core number. Once the core number is computed, the request is routed, at step 304, to the dedicated CPU core for the stripe. In this example, computed core is Core 1 350. At step 311, Core 1 350 receives the IO request from Core 0 300. At step 312, the local data structures are updated for this stripe in the CPU L1 cache. At step 313, the data cache in the local memory controller is checked and updated. Next, at step 314, the data on drives is updated consistently for this stripe. Finally, Core 1 350 routes the request completion back to the original CPU which received the request from the network, which leads back to Core 0 300. The final step 305 of the exemplary process allows Core 0 300 to complete the original IO request on the network.

In the model shown in FIG. 3A, all IO operations are considered asynchronous because multiple operations may be overlapping at any given time. In the example shown in FIG. 3A, after Core 0 300 routes a request to Core 1 350, it immediately can start the next request. In this way, IO is pipelined, and efficiency and speed is maintained.

Figure 3B:
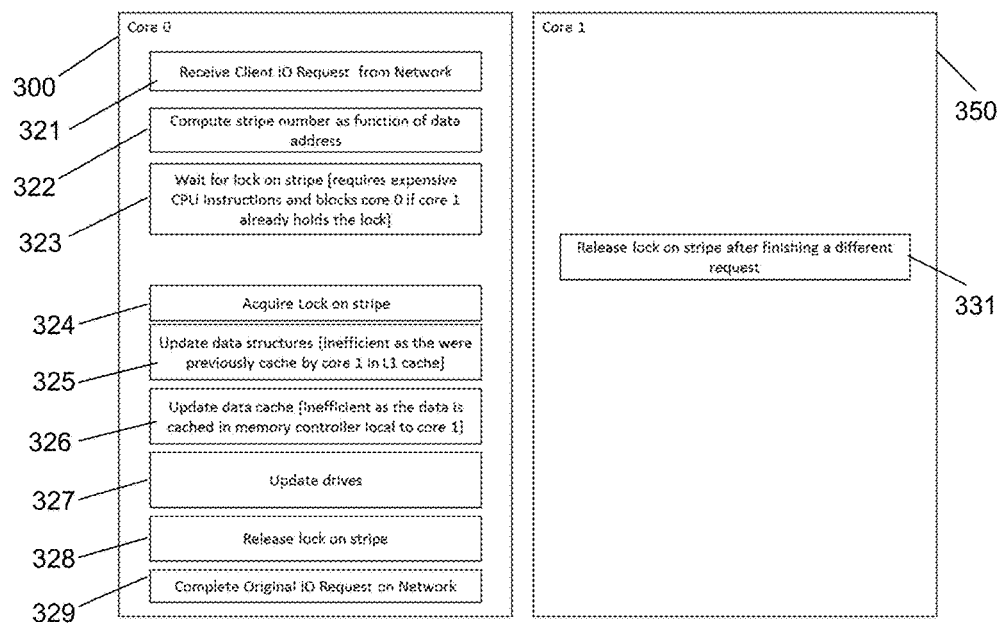
FIG. 3B illustrates a conventional approach to RAID algorithms using locks, according to an exemplary embodiment of the present subject disclosure.

FIG. 3B illustrates a comparison of IO operations using a conventional locking technique, thereby highlighting the inefficiencies. The figure compares a traditional approach to RAID algorithms using locks (such as a software mutex) to control access to a stripe of data. Some of the deficiencies of this conventional technique, that are improved upon by the present subject disclosure, are noted in the steps.

In the conventional process illustrated in FIG. 3B, Core 0 300 begins by receiving a client IO request from the network, at step 321. At step 322, the data address of the IO request is examined to compute the stripe number. These first two steps, namely step 321 and 322, are similar to the first two steps of the exemplary process illustrated in FIG. 3A. However, this is where the two processed begin to diverge. At step 323, Core 0 300 has to wait for the lock on stripe. This step requires expensive CPU instructions and blocks Core 0 300 if Core 1 350 already holds the lock on the data address. Next, at step 331, Core 1 350 releases the lock on stripe after finishing a different request 331. Thus, if Core 1 350 is "busy" engaged in a different request, the IO request received at step 321 must wait until Core 1 350 releases the lock on the stripe. Once that occurs, then the process advances to step 324, which is Core 0 300 acquiring a lock on the stripe. At step 325, the data structures are then updated at Core 0 300. This step is inefficient as the data was previously cached by Core 1 350 in the L1 cache. At step 326, the data cache in Core 0 300 is updated. Again, this step is inefficient as the data was previously cached in memory controlled local to Core 1 350. At step 327, the drives are updated. At step 328, there is a release lock on stripe. Finally, at step 329, Core 0 300 completes the original IO request on the network.

Step 323 is the most expensive step in the process in terms of CPU time and resources as it requires Core 0 to search all other cores for the lock on the stripe. Steps 324 and 325 are also expensive in terms of CPU time and resources. One of the novel features of the present subject disclosure is the elimination of step 324 to create efficiencies in the process.

Further comparing and contrasting the exemplary technique of the present subject disclosure, as illustrated in FIG. 3A, with the conventional lock technique, shown in FIG. 3B, it is evident that the latter presents a more rigid and static method as the various cores must await other cores before they can take the next step. The cores do not otherwise function without having the locks released by another core. In contrast, the present exemplary technique (shown in FIG. 3A), allows for various cores to operate simultaneously, increasing speed and efficiency.

With the present technique, as incoming requests occur for data, the requests are efficiently routed to the correct CPU. The policy for assigning RAID stripes to CPU cores may be a simple round robin implementation, or secure hash lookups to offer protection against intentional or inadvertent collisions where the IO isn't evenly distributed.

Table 1 shows an exemplary comparison of using a round robin algorithm to map the stripe to CPU core number in a predictable pattern, versus using a hash algorithm to do the mapping in a non-predictable pattern. The predictable pattern gives predictable performance but may suffer "worst-case" poor performance for simple sequences of IO that happen to map to the same core. The hash algorithm does not have any predictable or common sequences that result in worst case performance, but minor variations in performance may result from any given IO sequence. Note that on average each CPU core handles an equal number of stripes and a random input sequence will work equally well with either algorithm.

TABLE 1

| Stripe Number | Round Robin CPU Core | Hash Algorithm CPU Core |
| --- | --- | --- |
| 0 | 0 | 0 |
| 1 | 1 | 0 |
| 2 | 0 | 1 |
| 3 | 1 | 1 |
| 4 | 0 | 1 |
| 5 | 1 | 0 |
| 6 | 0 | 1 |
| 7 | 1 | 0 |
| 8 | 0 | 0 |
| 9 | 1 | 1 |

Figure 4:
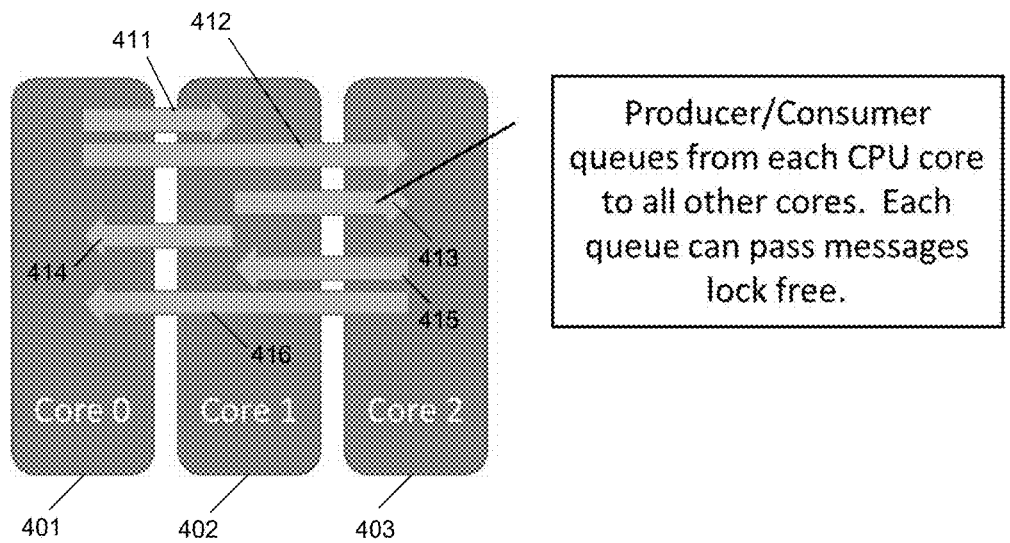
FIG. 4 illustrates efficient message passing with producer-consumer queues, according to an exemplary embodiment of the present subject disclosure.

FIG. 4 illustrates that efficient message passing is critical to implement this technique. Message passing may be accomplished in many ways. However, dedicated producer-consumer queues for every pair of CPU cores provide a lock free message passing approach. In the example shown, Core 0 401 has a queue 411 to Core 1 402 and queue 412 to Core 2 403. Core 1 402 has a queue 413 to Core 2 403 and queue 414 to Core 0 401. Core 2 403 has a queue 415 to Core 1 402 and queue 416 to Core 0 401. These producer/consumer queues from each CPU core to all other cores show that each queue can pass messages lock free.

Isolating data regions to individual CPU cores also allows scalable caching solutions, where each core can independently read/write data from a high speed cache for improved performance. This cache may be a DIMM on a dedicated memory controller attached to the CPU core.

Figure 5:
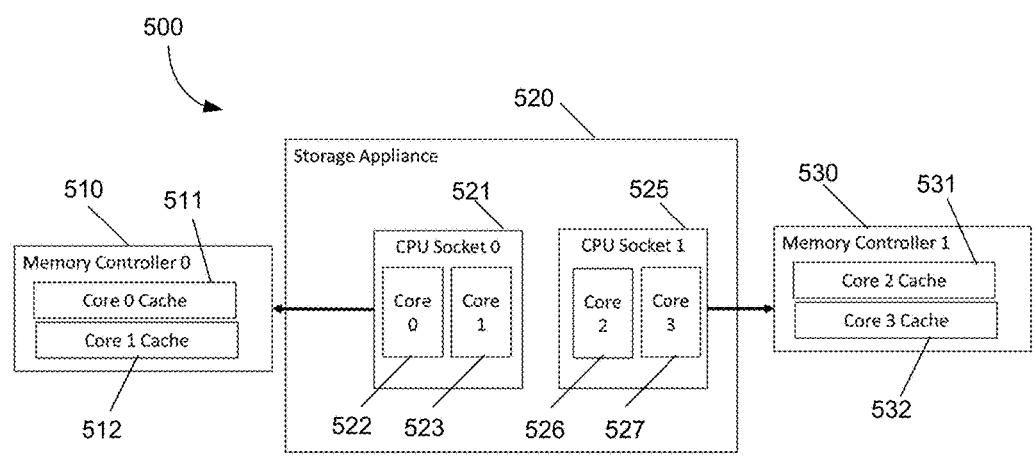
FIG. 5 illustrates scalable caching using a dedicated memory controller, according to an exemplary embodiment of the present subject disclosure.

FIG. 5 shows scalable caching system 500 using a dedicated memory controller 510, 530 per CPU socket 521, 525, respectively. Each CPU core 522, 523, 526, 527 maintains its own cache 511, 512, 531, 532 in the local memory controller 510, 530. Storage application 520 has two sockets labeled as CPU Socket 0 521 and CPU Socket 1 525. CPU Socket 0 521 includes two cores, Core 0 522 and Core 1 523. Memory Controller 510 includes Core 0 Cache 511 and Core 1 Cache 512. Core 0 522 has its own Core 0 Cache 511, and Core 1 has its own Core 1 Cache 512. The same architecture is evident for CPU Socket 1 525 and its Core 2 526 and Core 3 527 and their interaction with Core 2 Cache 531 and Core 3 Cache 532 on Memory Controller 1 530. The cache metadata (that describes the location of user data) is efficiently stored per CPU core which is optimized for internal L1 caching. By routing IO requests to cores, all of these hardware memory accesses are optimized. As a non-limiting example, consider an IO write from the user. The process according to this subject disclosure maps that IO address to a single core, e.g., Core 1 523. Core 1 523 will save the data in the corresponding Core 1 Cache 512. This save may require a memory copy of the data, or it may be zero copy if the data already resides in Memory Controller 0 510. Core 1 523 will also track the metadata for the request, including the IO request address and cache location. This metadata will also be stored in the local Memory Controller 0 510 and efficiently cached in the core 1 L2 cache. Subsequent reads for the data will be directed to Core 1 523 and both the metadata and data location are optimal for efficiently processing the read request.

Efficient RAID implementations for SSDs allow extensions to standard RAID algorithms. Since individual media cells in NAND flash may fail, it is desirable to use redundancy information to immediately rebuild any data that is discovered as corrupt during individual read IOs. Corruption may be discovered either with Error-correcting code (ECC) failures on the media, or end-to-end data protection failures in higher level software. This runtime repair is ideal for improving the Mean Time to Data Loss (MTTDL) for solid state drives.

The examples and methods described above are not limited to software or hardware, but may be either or a combination of both. If software, the method described is presented as code in a software program. If hardware, a processor is used to conduct the steps which are embedded within the hardware. The subject matter may also be a combination of software and hardware with one or more steps being embedded within a hardware component, and the other steps being part of a software program.

The examples are not limited to a single storage appliance. The method can be used perform a distributed RAID algorithm over several computers by mapping a RAID stripe to a CPU core on any computer system, and routing the request to the appropriate computer's core. The algorithm may additionally have multiple layers in the routing hierarchy, where first a destination computer is selected and subsequently a core on the destination computer is selected.

The present subject disclosure is not limited to a full drive RAID implementation where a user accesses addressable sectors. It applies equally well to saving a data object (such as a file) with any RAID algorithm redundancy information. For example, a large object may be mirrored to any location on two or more drives to implement a RAID1 object storage. Similarly, the object may be split into chunks with parity computed across the chunks. Each chunk would be saved to a location on different drives. These algorithms are equivalently applied to object storage by always processing the object on a single CPU core. The object equates to a stripe. The object identifier (such as the file name) equates to the stripe number. The CPU core is computed by mapping the object identifier to a CPU core number with a hash function.

The illustrations and examples provided herein are for explanatory purposes and are not intended to limit the scope of the appended claims. It will be recognized by those skilled in the art that changes or modifications may be made to the above described embodiment without departing from the broad inventive concepts of the subject disclosure. It is understood therefore that the subject disclosure is not limited to the particular embodiment which is described, but is intended to cover all modifications and changes within the scope and spirit of the subject disclosure.

What is claimed is:

1. A method for lock-free RAID implementation, comprising:
   receiving at a first core a client input/output (IO) request having a data address;
   computing a stripe number as a function of the data address;
   computing a central processing unit (CPU) core number as a function of the stripe number;
   routing the request to a second core having the computed CPU core number;
   updating a local data structure for the stripe number in a computer CPU cache on the second core;
   and routing the request back to the first core.

2. The method of claim 1, further comprising checking and updating a data cache in a local memory controller on the second core.

3. The method of claim 2, further comprising updating data on drives consistently for the stripe number.

4. The method of claim 1, further comprising completing the IO request.

5. The method of claim 1, wherein neither the first core nor the second core have a lock on the stripe number.

6. A storage appliance, comprising:
   a plurality of central processing unit (CPU) sockets, each socket including a plurality of cores,
   wherein each core operates independently without locks, the storage appliance adapted to:
   receive at a first core a client input/output (IO) request having a data address;
   compute a stripe number as a function of the data address; computing a central processing unit (CPU) core number as a function of the stripe number;
   route the request to a second core having the computed CPU core number;
   update a local data structure for the stripe number in a computer CPU cache on the second core; and
   route the request back to the first core.

7. The storage appliance of claim 6, wherein the steps further comprise checking and updating data cache in a local memory controller on the second core.

8. The storage appliance of claim 7, wherein the steps further comprise updating data on drives consistently for the stripe number.

9. The storage appliance of claim 6, wherein the steps further comprise completing the IO request.

10. The storage appliance of claim 6, wherein none of the plurality of cores has a lock on the stripe number.

11. A storage appliance, comprising:
    a plurality of central processing unit (CPU) sockets, each socket including a plurality of cores;
    wherein each core operates independently without locks;
    wherein when acted upon by a processor, is adapted for performing the following steps:
    receiving at a first core a client input/output (IO) request having a data address;
    computing a stripe number as a function of the data address;
    computing a central processing unit (CPU) core number as a function of the stripe number;
    routing the request to a second core having the computed CPU core number;
    updating a local data structure for the stripe number in a computer CPU cache on the second core; and
    routing the request back to the first core, wherein none of the plurality of cores has a lock on the stripe.

12. The storage appliance of claim 11, wherein the steps further comprise checking and updating a data cache in a local memory controller on the second core.

13. The storage appliance of claim 12, wherein the steps further comprise updating data on drives consistently for the stripe number.

* * * * *